United States Patent Office 2,807,660
Patented Sept. 24, 1957

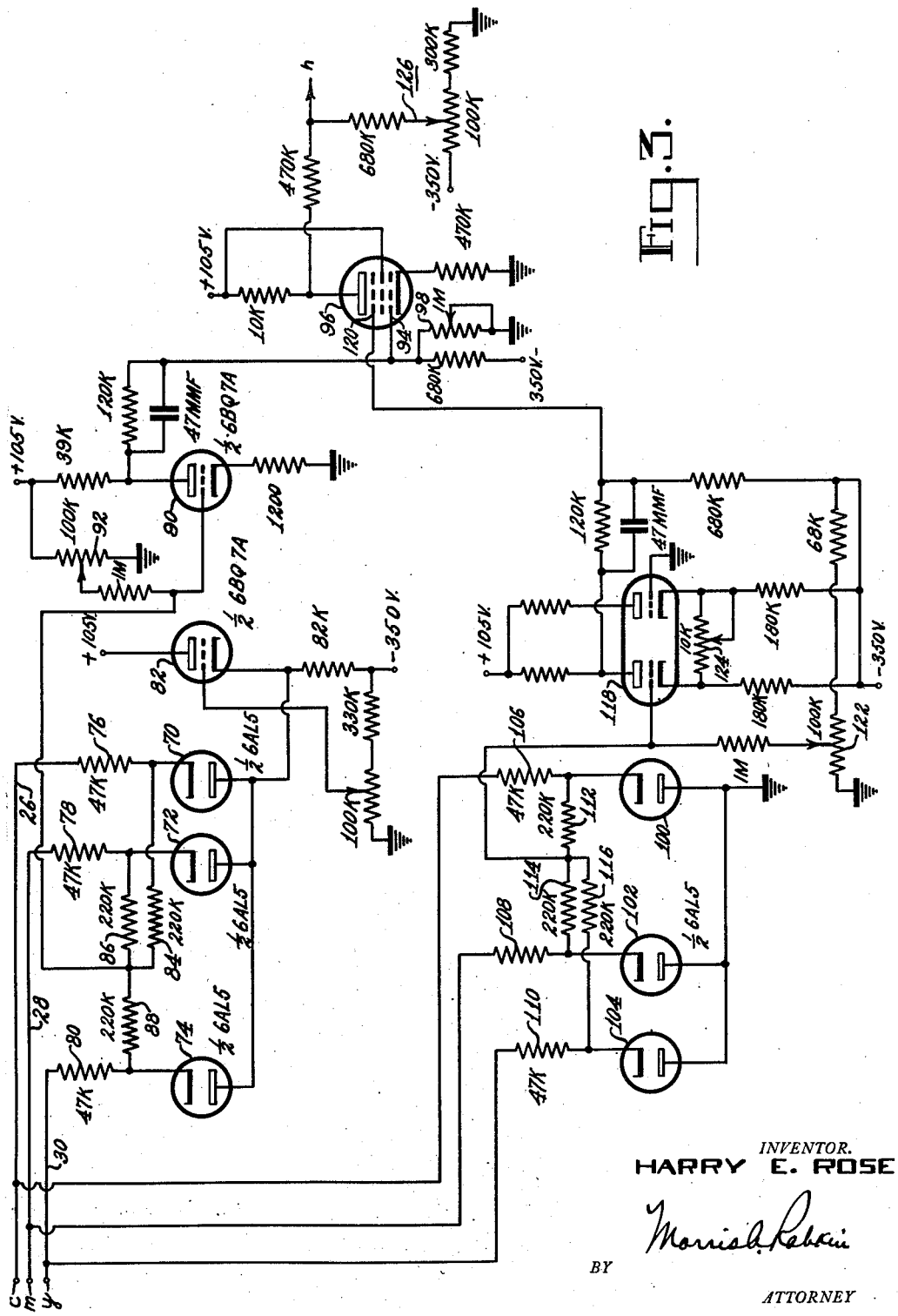

2,807,660

COLOR-CORRECTION SYSTEMS

Harry E. Rose, Delaware Township, Camden County, N. J., assignor to Radio Corporation of America, a corporation of Delaware Application July 30, 1953, Serial No. 371,355

12 Claims. (Cl. 178—5.4)

This invention relates to color-correction systems for color-reproduction processes, and more particularly to a system for obtaining a black plate for use in four-color reproduction.

A four-color system of reproducing a colored original by means of printing plates has been generally preferred. While it is theoretically possible to produce any color, within certain limits, by combining, in proper proportions, inks of the three subtractive primary colors, cyan, magenta and yellow, the use of the three primaries and black has a number of advantages. In a three-color system, the blacks and grays of the original are reproduced by superimposing all three colored inks. However, due to deficiencies in the inks, a good black cannot generally be produced by an overlay of the three primaries. In four-color printing, the use of black ink in addition to the primaries provides a greater brightness range. Other advantages of the four-color system are the saving of relatively expensive colored inks and sharper outlines and details in the printed reproduction.

In a four-color system, the colored original is scanned with a beam of light to produce three sets of electrical signals representative of the additive color primaries, red, green and blue. From these signals, four sets of corrected electrical signals are computed representative of the subtractive primaries and black. The corrected signals are then employed to control the intensity of a light source to expose four color-corrected negatives or "printers" that are used to make the printing plates.

In the past, it was proposed to print black ink where all three of the colored inks would be superimposed in the three-color system. To compensate for the addition of black ink, the undercolor that produced black was removed. A dot of black ink replaced the area of the smallest color dot, and the sizes of the other color dots were correspondingly reduced by the size of the black dot. One system for doing this is shown in the patent to Hall, No. 2,231,668. This type of system for preparing the color-corrected negatives has not given accurate results. As explained in the patent to Hardy, et al., No. 2,434,561, the accurate computation of the black and subtractive primary dot sizes requires consideration of much more complex relationships among the dot sizes than the simplified theory implies. The Hardy patent discloses a system for computing the ink dot sizes that takes into account these complex relationships.

In the preparation of a black printer, it is not only desirable that theoretical requirements are met, but also that the practical requirements and preferences of the photoengraving and graphic arts are met. It has been found, for example, that it is preferred that black not be printed, or printed only in skeleton amounts, in certain instances even though all three of the subtractive primaries are present. Furthermore, these preferences are not uniform. It is apparent, therefore, that a system for preparing a black printer that can be readily adapted to carry out the varied requirements and preferences of the graphic arts is needed.

Accordingly, it is an object of this invention to provide a novel and improved system for producing a black printer.

Another object of this invention is to provide an improved and simple method and apparatus for producing, from a colored original, four color-corrected records corresponding to three primary colors and black.

Still another object of this invention is to provide a simple and economical system for color-correction computation that may be readily adapted to meet varied preferences and requirements in the amount of black to be printed.

Yet another object of this invention is to provide in a color-correction system a new and simple black signal generator for generating a signal representative of the black in a colored original.

These and other objects of this invention are achieved in a method and apparatus that is based on the practical requirement that the amount of undercolor removal, i. e., the replacing of a three-color overprint area with black, should vary with the brightness and chromaticity of the area under consideration. For practical purposes, black is present in areas of low brightness only if all three primaries are present and to an extent substantial enough to indicate low color saturation or purity. In the patent application of H. J. Woll Serial No. 371,371, filed concurrently herewith on July 30, 1953, and assigned to the same assignee, there is described a color-correction system that is based on these principles. The invention of the present application is based on similar principles, and is an improvement over that of Woll, noted above, in the attainment of more accurate results.

In an embodiment of this invention, there is employed a modified form of the color-correction computer disclosed in the Hardy patent noted above. The color-correction computer receives as inputs electrical signals representative of the three additive color primaries. These signals are produced by scanning the colored original. The outputs of the computer are electrical signals representative of the dot sizes of the three subtractive ink primaries, cyan, magenta and yellow. The three sets of ink signals $c$, $m$ and $y$ are applied to three input channels in a black signal generator. The signals in each channel are limited by a separate limiter circuit to the portions below a predetermined maximum. The limited signals from all three channels are added and applied to a fourth channel. The sum of the limited ink signals provides a rough inverse approximation of brightness. This signal sum increases as brightness decreases. Therefore, to avoid confusion, the quantity which is related to inverse brightness will be referred to in the following description as "darkness." The initial limiting serves to eliminate portions of the signals that do not contribute to the amount of black in the subject, but rather are indicative of high saturation. The signal sum is then applied to a threshold device which limits signal passage to the excess of the sum over a predetermined threshold of darkness. A gating device controls the passage of the excess signal from the fourth channel to a high-gain amplifier. A gating signal is produced only if ink signals are present in all three of the input channels, and if each of these signals is present in excess of a minimum amount. Thus, the gating signal provides a rough indication or check of the existence of a low level of saturation or purity. In the absence of these signal conditions, an inhibiting signal is produced that prevents the excess signal from passing through the gating device. When the threshold and gating devices permit the excess signal to pass into the amplifier, a black signal proportional to the excess signal is generated.

The gain of the amplifier is the proportionality factor. The black signal is fed back into the computer to adjust the initial values of the ink primaries. The ink primary signals and the black signal then seek equilibrium values, dictated by the conditions set into the black signal generator and computer, and may be used to control the exposure of the color-corrected negatives or printers. By adjustment of the limiting levels for the ink signals in producing the signals related to brightness and saturation, as well as adjustment of the darkness threshold, the amount of black generated is varied. Thus, the quality or character of the reproduction may be controlled and the effects of different inks may be accommodated.

The novel features of this invention as well as the invention itself both as to its organization and mode of operation may be better understood from the following description when read together with the accompanying drawings in which:

Figure 3 is a schematice circuit diagram of a black signal generator embodying this invention.

Figure 1:
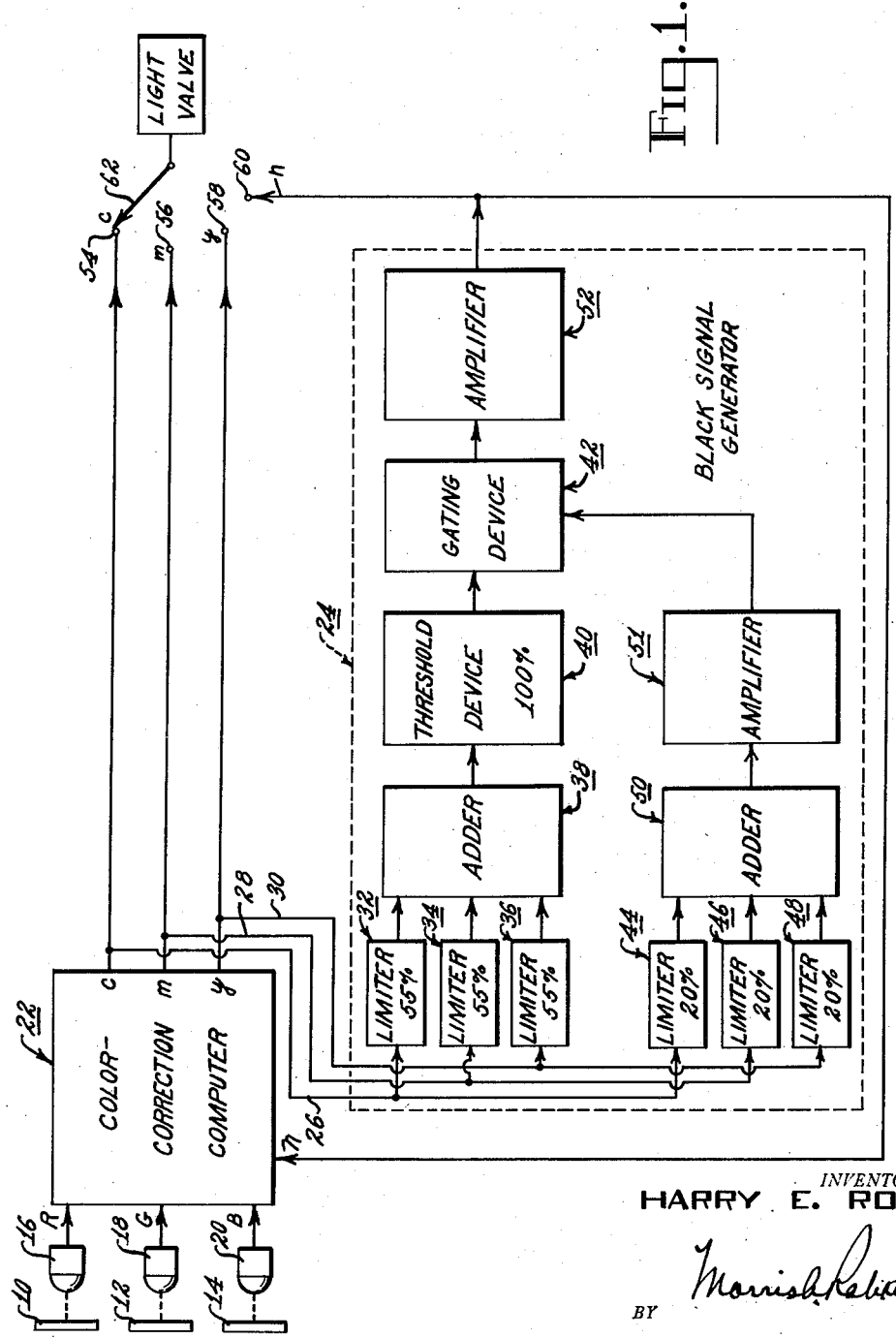
Figure 1 is a block diagram of a color-correction system embodying this invention.

Referring now to Figure 1, there is shown a color-correction system embodying this invention. An original subject in color is scanned to provide the information from which color-corrected negatives and printing plates are made. The subject in color is shown in the form of three transparent color separation positives, 10, 12 and 14. These positives may be made by photographing the original subject three times through three different filters, red, green and blue, so that the transparencies of the positives are characteristic of the corresponding colors of the original subject. A scanning light source (not shown) applies a narrow beam to corresponding areas of each of the uncorrected separations 10, 12 and 14. The light transmited through the separations is converted to representative electric signals by different photocells 16, 18, and 20. These signals, representative of the primary color components red, green and blue of the subject, are applied as inputs to a color correction computer 22. The computer may be the same as that disclosed in the patent to Hardy, et al., noted above, except that the circuits used for generating a black signal in that computer are replaced by the black signal generator embodying this invention. The outputs of the color-correction computer 22 represent the subtractive primary colors cyan, magenta and yellow which will be referred to as $c$, $m$ and $y$. These signals are proportional to the dot sizes of the inks to be used in a half-tone printed reproduction.

The output signals from the color-correction computer 22 are fed to a black signal generator 24 through three channels 26, 28 and 30, one for each color component. The signals in these channels are limited by separate first limiter circuits 32, 34, 36 that pass only the signal portions below a predetermined maximum. The limited signals are added in a first adder circuit 38, and the sum of the limited signals is then applied to a threshold device 40. This threshold device 40 passes the portion of the signal sum that is in excess of a predetermined limit. The excess signal from the threshold device 40 is fed to a gating device 42. The signals in the three channels 26, 28, and 30 are also applied to individual second limiter circuits 44, 46, 48 which limit the signal in each channel to be not greater than a predetermined magnitude. The limited signals are added in a second adder circuit 50, and the output of the adder is amplified by an amplifier 51 and applied as a control signal to the gating device 42. Signals passing through the gating device 42 are applied to another amplifier 52, and the output of this amplifier 52 is then fed back as another input to the color-correction computer 22.

Consider the signals from the color-correction computer 22 as representing 0% of full color for a minimum signal, and 100% of full color for a maximum signal. These signals are limited to a maximum of 55% of full color by the first limiter circuits 32, 34, 36, the significance of which is described in detail below. The limited signals from all three channels 26, 28, 30 are then added in the first adder 36 to produce sum signals that provide a rough inverse indication of brightness. The larger the sum signal is for any given point on the original subject being scanned, the greater the total amount of color that is to be printed in an overlay of $c$, $m$ and $y$, and, therefore, generally the brightness is lower or the "darkness" is greater at that point. The threshold device 40 provides a darkness threshold for the sum signals. The threshold device passes to the gating device only the portions of the sum signals in excess of a predetermined minimum, which is 100% for this embodiment of the invention. The black signal that is finally generated is proportional to this excess signal. Thus, the subtractive effects of limited portions of $c$, $m$ and $y$ must result in a darkness level that is greater than that corresponding to 100% of full color for black to be printed.

Figure 2:
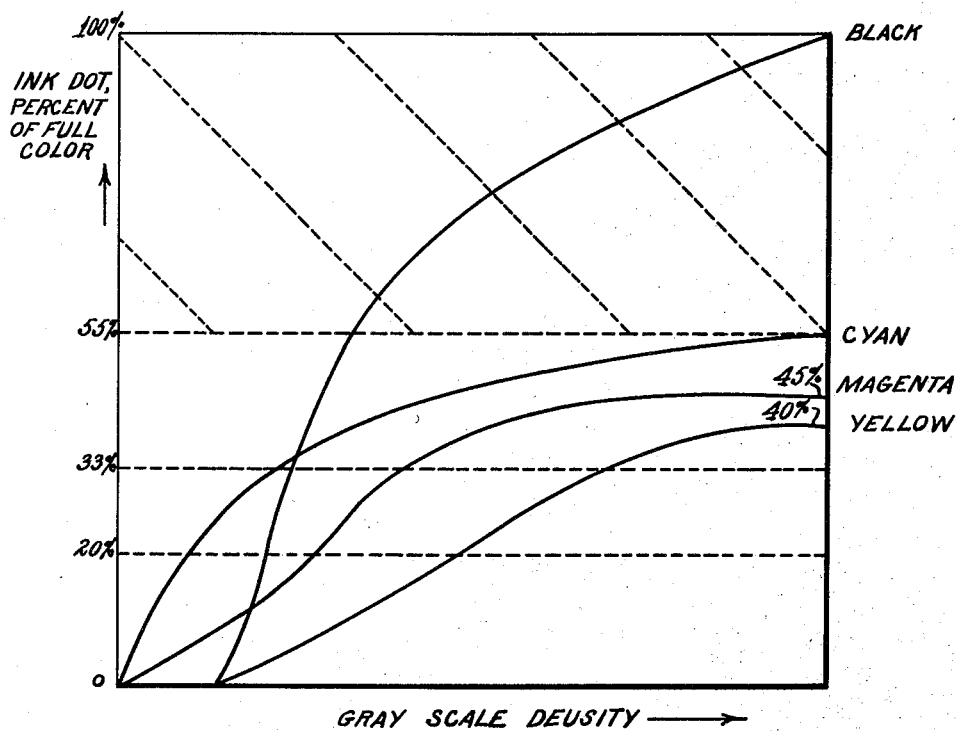
Figure 2 is a graphical diagram of the amounts of colored and black inks to produce a given gray scale.

The function of the 55% limiters 32, 34, 36 may be appreciated by referring to Figure 2 which is a graphical diagram of the approximate relation between the gray scale and ink dot values for four typical production printing inks, cyan, magenta, yellow and black. For any particular gray scale density, the corresponding ordinates of the four ink curves indicate the proper amounts of inks that combine in an overlay to produce that gray density. In the printing industry, 100% black is printed with relatively equal amounts of the other three inks that total only approximately 140%. Usually the values are respectively 55%, 45% and 40% for $c$, $m$ and $y$. These values are the ordinates of the curves for the darkest gray on the scale. For lighter grays, lesser values of $c$, $m$ and $y$ are printed with black of less than 100%. Thus, it may be seen that, with these particular inks, signals that are not greater than 55%, i. e., medium and low values of ink, provide the information that is used to generate the black plate. Signal portions greater than 55% represent high saturation of color.

Therefore, by limiting the ink signals $c$, $m$ and $y$ to 55%, larger values of any ink signal, which represent high saturation, are not included in the sum signals and, consequently, do not increase the black signal. In this way the proper amount of black is generated in areas of high saturation, and black is made independent of increases of saturation above 55% for the colored inks, which represents approximately the upper three-quarters of saturation possible in these colors.

The threshold of 100% represents an average of 33% for each of the three colored inks below which black is not generated. A dotted line for the ordinate 33% ink value is shown in Figure 2. Thus, by means of the darkness threshold of 100%, the effects of saturation on the magnitude of the black signal are restricted to only the region between 33% and 55%. This is but a small region in the saturation scale, less than the percentage indicated.

By means of the gating device 42 and the second limiter and adder circuits, 44, 46, 48, 50 an additional check is provided to insure that black is generated only in areas of low saturation. The second limiter circuits 44, 46, 48 are set to pass only the portions of signals from each channel that are less than 20% of full color. These limited signals are summed in the second adder circuit 50 and amplified in the amplifier 51. The output of the amplifier 51 applies an inhibiting signal to the gating device 42 when any one of the signals in the three channels is less than 20%; but when the signals in all three channels become equal to or greater than 20%, a gating signal is produced and applied to the gating device 42. The gating and inhibiting signals are a rough indication of saturation or purity of color. If any of the ink signals are absent, or if they all do not exceed a substantial percentage of color, namely 20%, there is an indication of one of two conditions: First, the color saturation is relatively high and black should not be present; or, second, saturation may be low but the medium and low values of inks are insufficient to exceed the darkness threshold of 100%. If the second condition exists, the darkness threshold device 40 prevents the generation of the black signal. If the first condition, high saturation, exists, an inhibiting signal blocks the gating device 42. However, if all three ink signals are present in substantial amounts, the saturation is low indicating that black should be present. In this case, a gating signal passes the excess darkness signal through the gating device 42 to the amplifier 52. It is seen that the threshold device and 20% limiters combine to keep undesirable saturation effects on generation of black to a minimum.

The darkness and saturation signals together indicate the brightness and chromaticity of a given area, with the darkness signal in excess of the darkness threshold providing a measure of the amount of black, and the saturation signal functioning as a check. The excess darkness signal that is gated into the amplifier 52 is amplified, and a proportional black signal $n$ is generated. The black signal is fed back to the color-correction computer 22 to reduce the initial values of $c$, $m$ and $y$ in accordance with the amount of black to be printed. The ink signals $c$, $m$, $y$ and $n$ seek equilibrium values as dictated by the conditions set into the black signal generator and the relationships in the computer.

The equilibrium values of the ink signals are taken as outputs at separate terminals 54, 56, 58, 60 respectively connected to the $c$, $m$ and $y$ channels 26, 28, 30 and the output of the amplifier 52. These outputs may be individually selected by a switch 62 and used to control a light valve 64 to expose four color-corrected negatives in the usual manner.

The values of 55% for the first limiters, 100% for the darkness thresholds, and 20% for the second limiters are merely exemplary and subject to change with printing conditions, inks and preferences in the character of the reproduction. For example, in the highlight regions, a minimum amount of black ink may be preferred. In that case, the darkness threshold or second limiter level would be increased, with the second limiter level always not greater than the average ink threshold. The overlay of the three colored inks then provide the gray information in these regions. Where more detail (black) is desired in the highlight regions, the darkness threshold may be reduced to near 0% and the second limiter level also reduced to 0%. For this purpose, a darkness threshold of 30% and a second limiter level of 10% has been found to be suitable.

To account for varied requirements and brightness effects of the different inks, the ink signals $c$, $m$ and $y$ may be given different weights when added in the first and second adder circuits 38, 50. Similarly, the limiting thresholds in the first and second limiter circuits may be non-uniform to account for varied saturation effects of the different inks. Both the threshold device 40 and gating device 42 may have gradual instead of sharp on-off characteristics, thereby generating a skeleton black plate in regions that would have no black, if sharp on-off transitions were used.

In Figure 3 of the drawings there is shown a schematic circuit diagram of a set of circuits that may be used for a black signal generator embodying this invention. In order to illustrate the operation of the circuit, an appropriate set of component values and operating potentials are shown in the drawings for the particular case of 55% and 20% limiting, and 100% darkness threshold. The particular values shown are not intended to be a limitation on the invention.

The ink signals $c$, $m$ and $y$ from the color-correction computer are fed as inputs in individual component channels 26, 28, 30. For the specific circuit values shown, these ink signals vary from $+4$ volts for no ink to $-16$ volts for full color. The ink signals in the different channels are applied to three diode limiter circuits made up of separate diodes 70, 72, 74 and resistors 76, 78, 80 connected to the cathodes thereof. The anodes of the diodes 70, 72, 74 are biased from the cathode resistor of a triode 82 which has its control grid set at a constant potential. The anodes of the diodes are thereby set at a voltage corresponding to 55% of full color which is approximately $-7$ volts for the embodiment shown so that the ink signals are clamped at this voltage. The first adder is made up of a simple network of resistors 84, 86, 88 one for each color component, and produces sum signals proportional to the sum of the limited voltages at the diode cathodes. The sum signals at the junction of the three resistors are applied to the control grid of a first amplifier tube 90 which is biased through an adjustable resistor 92 connected to the anode supply voltage. The output of the amplifier 90 is taken at the anode of the tube and applied to the first control grid 94 of a gating amplifier 96 which is negatively biased through an adjustable resistor divider 98. By manipulating the biasing resistor 92 of the first amplifier 90 when the adder output corresponds to an ink value sum of 140%, the first control grid 94 of the gating amplifier 96 is placed at 0 volts, and maximum current flows in the gating amplifier corresponding to 100% of black. The darkness threshold is determined by the setting of the adjustable grid resistor 98 when the adder output corresponds to an ink value sum of 100%. The gating amplifier 96 is just cut off under this condition. Thus, the gating amplifier circuit includes the additional function of the threshold device.

The ink signals $c$, $m$ and $y$ are also fed through the color component channels 26, 28, 30 to the second limiter circuits made up of separate diodes 100, 102, 104 and resistors 106, 108, 110 connected to the cathodes thereof. The anodes of the diodes 100, 102, 104 are biased at the 20% limiting level, which is zero voltage for this embodiment, and the diodes conduct for negative ink signals to clamp them at ground. The limited signals are added in the second adder circuit made up of a second network of resistors 112, 114, 116, and the output is applied to the control grid of a differential amplifier 118. The output of the differential amplifier 118 is connected to the second control grid 120 of the gating amplifier 96. The bias on the control grid of the differential amplifier 118 is set through an adjustable resistor 122 to provide (1) an inhibiting voltage on the second control grid 120 of the gating amplifier 96 when any one of the ink signals $c$, $m$ and $y$ is positive so that the voltage at the junction of the adder resistors 112, 114, 116 is above ground, and (2) a gating voltage when all three of the second limiting diodes conduct, and the adder output is at ground potential. An adjustable resistor 124 connected between the cathodes of the differential amplifier 118 fixes the speed of the gating action. The output of the gating amplifier 96 is taken at the anode of the tube through an adjustable resistor divider 126. The gain of the gating amplifier 96 may be set so that it also functions as the output amplifier 52 shown in Figure 2. The resistor divider 126 is set so that the black ink signal $n$ that is generated equals zero when the darkness threshold of 100% is not exceeded. Alternatively, the output of the gating amplifier 96 may be applied to an additional D.-C. amplifier (not shown) of any appropriate type for generating the black signal $n$. Where this invention is used with the color-correction computer disclosed in the patent to Hardy et al., noted above, the additional D.-C. amplifier may be that shown in Figures 5 or 5A of that patent.

It may be seen from the above description of this invention that a simple, novel, and improved system for producing a black printer is provided. This system may

What is claimed is:

1. In a system for obtaining color corrected records from a subject having color characteristics by means of electrical signals representative of color components of said subject, the combination of a plurality of initial channels for carrying said signals with each channel arranged for carrying signals corresponding to a different color component, a subsequent channel, and means coupling said initial channels to said subsequent channel including means for limiting passage of signals from said initial channels, and means for adding said limited signals, said subsequent channel including means for limiting passage of the sum of said limited signals therethrough.

2. In a system for obtaining color corrected records from a subject having color characteristics by means of electrical signals representative of color components of said subject, the combination as recited in claim 1 wherein said means for limiting passage of signals from said initial channels only passes portions thereof below a predetermined maximum, and said means for limiting passage of the sum of said limited signals through said subsequent channel only passes portions thereof in excess of a predetermined minimum.

3. In a system for obtaining color corrected records from a subject in color by means of electrical signals representative of the primary color components of said subject, the combination of three electrical channels arranged for respectively carrying said electrical signals corresponding to the primary colors, a fourth electrical channel, and means coupling said initial channels to said fourth channel including means for passing only the portions of signals from said three channels below a predetermined maximum, and means for adding said passed signals, said fourth channel including amplifier means at the output thereof, and means for passing to said amplifier means only the portions of the sum of said passed signals in excess of a predetermined minimum.

4. In a system for obtaining color corrected records from a subject in color by means of electrical signals representative of the primary color components of said subject, the combination as recited in claim 3 wherein said predetermined maximum is the same for each channel and greater than or equal to a signal level corresponding to 40% of full color.

5. In a system for obtaining color corrected records from a subject in color wherein a color-correction computer generates corrected electrical signals in accordance with uncorrected color component values of said subject; the combination therewith of a plurality of electrical channels for carrying said corrected signals with each channel arranged for carrying signals corresponding to a different color component, means for limiting passage of said signals from said electrical channels to portions below a predetermined maximum, means for adding said limited signals, amplifier means, means for applying at least portions of the sum of said limited signals to said amplifier means, and means for feeding back the output of said amplifier means to said color-correction computer.

6. In a system for obtaining color corrected records from a subject in color wherein a color-correction computer generates corrected electrical signals in accordance with uncorrected color component values of said subject; the combination therewith of a plurality of electrical channels for carrying said corrected signals with each channel arranged for carrying signals corresponding to a different color component, means for limiting passage of said signals from said electrical channels to portions below a predetermined maximum, means for adding said limited signals, means for limiting passage of the sum of said limited signals to portions in excess of a predetermined minimum, amplifier means for producing output signals representative of the black in said subject in accordance with said limited sum signals, means for feeding back said black output signals to said color-correction computer, and a plurality of output terminals respectively coupled to said channels and the output of said amplifier means.

7. In a system for obtaining color corrected records from a subject in color by means of electrical signals representative of color components of said subject, the combination of a plurality of channels for carrying said signals with each channel arranged for carrying signals corresponding to a different color component, means for limiting said signals from said channels to portions below a predetermined maximum, means for producing signals related to the brightness of said subject in accordance with said limited signals from all of said channels, means for producing signals related to the color saturation of said subject in accordance with signals in all of said channels, and means responsive to said brightness and saturation signals for producing signals representative of the black of said subject.

8. In a system for obtaining color corrected records from a subject in color by means of electrical signals representative of color components of said subject, the combination of a plurality of initial channels for carrying said signals with each channel arranged for carrying signals corresponding to a different color component, a subsequent channel, means coupling said initial channels to said subsequent channels including means for limiting passage of signals from said initial channels, and means for adding said limited signals, said subsequent channel including means for limiting passage of the sum of said limited signals therethrough, means for producing control signals only if signals are present in all of said initial channels, and means responsive to said control signals and to signals passed through said subsequent channel for producing signals representative of the black of said subject.

9. In a system for obtaining color corrected records from a subject in color by means of electrical signals representative of color components of said subject, the combination as recited in claim 8 wherein said means for limiting passage of signals from said initial channels only passes portions thereof below a predetermined maximum, and said means for limiting passage of the sum of said limited signals through said subsequent channel only passes portions thereof in excess of a predetermined minimum.

10. In a system for obtaining color corrected records from a subject in color by means of electrical signals representative of the primary color components of said subject, the combination of three electrical channels arranged for respectively carrying said electrical signals corresponding to the primary colors, a fourth electrical channel, means coupling said initial channels to said fourth channel including means for passing only the portions of signals from said three channels below a predetermined maximum, means for adding said passed signals, said fourth channel including amplifier means at the output thereof, means for passing to said amplifier means only the portions of the sum of said passed signals in excess of a predetermined minimum, and control means responsive to the presence of signals of minimum magnitudes in all of said three channels for rendering said fourth channel conductive to said amplifier means.

11. In a system for obtaining color corrected records from a subject in color wherein a color-correction computer generates corrected electrical signals representative of primary color components in accordance with uncorrected color component values of said subject, the combination therewith of three electrical channels arranged for respectively carrying said electrical signals corresponding to the primary colors, a fourth electrical channel, and means coupling said three channels to said fourth channel including means for passing only the portions of signals from said three channels below a predetermined maximum, and means for adding said limited signals, said fourth channel including means for passing therethrough only the portions of the sum of said limited signals in excess of a predetermined threshold, an amplifier at the output of said fourth channel, control means responsive to the presence of signals of minimum magnitudes in all of said three channels for rendering said fourth channel conductive to said amplifier means, and means for feeding back the output of said amplifier as an input to said color-correction computer.

12. In a system for obtaining color corrected records from a subject in color by means of electrical signals representative of primary color components of said subject, a black signal generator comprising three electrical channels arranged for respectively carrying said electrical signals corresponding to the primary colors, three limiter circuits for respectively passing only the portions of signals in said three channels below a predetermined maximum, a resistor adder circuit for producing signals proportional to the sum of signals passed by said limiter circuits, an amplifier, a gating circuit coupled between said adder circuit and amplifier for controlling the passage of signals to said amplifier, said gating circuit including biasing means for providing a limiting threshold for said sum signals, three additional limiter circuits having a predetermined limiting level respectively coupled to said channels, and additional resistor adder and amplifier circuits coupled to said additional limiter circuits for producing a gating signal only if signals applied to said additional limiter circuits are at least equal to said predetermined limiting level.

References Cited in the file of this patent

UNITED STATES PATENTS

| | | |
|---|---|---|
| 2,253,086 | Murray | Aug. 19, 1941 |
| 2,413,706 | Gunderson | Jan. 7, 1947 |
| 2,434,561 | Hardy | Jan. 13, 1948 |
| 2,560,567 | Gunderson | July 17, 1951 |
| 2,691,696 | Yule | Oct. 12, 1954 |
| 2,710,889 | Tobias | June 14, 1955 |
| 2,721,892 | Yule | Oct. 25, 1955 |